United States Patent

Kalkunte et al.

[11] Patent Number: 5,854,900
[45] Date of Patent: Dec. 29, 1998

[54] METHOD AND APPARATUS AVOIDING CAPTURE EFFECT BY ADDING A SLOT TIME TO AN INTERPACKET GAP INTERVAL IN A STATION ACCESSING AN ETHERNET NETWORK

[75] Inventors: Mohan Kalkunte, Sunnyvale; Jim Mangin, San Ramon, both of Calif.

[73] Assignee: Advanced Micro Devices, Inc., Sunnyvale, Calif.

[21] Appl. No.: 656,491

[22] Filed: May 31, 1996

[51] Int. Cl.⁶ .................................................. H04L 12/413
[52] U.S. Cl. .............................. 395/200.68; 395/200.58; 395/200.6; 395/200.65; 370/85.1; 370/85.2; 370/85.3; 370/85.6; 370/85.11
[58] Field of Search .................. 395/200.68, 200.69, 395/200.71, 200.6, 200.65, 200.58; 370/85.3, 79, 85.1, 85.2, 85.6, 85.11, 448; 364/DIG. 1

[56] References Cited

U.S. PATENT DOCUMENTS

| | | | |
|---|---|---|---|
| 5,136,582 | 8/1992 | Firoozmand | 370/400 |
| 5,210,749 | 5/1993 | Firoozmand | 370/463 |
| 5,297,143 | 3/1994 | Pridrich et al. | 370/85.3 |
| 5,319,641 | 6/1994 | Fridrich et al. | 370/85.3 |
| 5,353,287 | 10/1994 | Kuddes et al. | 370/85.3 |
| 5,404,353 | 4/1995 | Ben-Michael et al. | 370/85.3 |
| 5,418,784 | 5/1995 | Ramakrishnan et al. | 370/445 |
| 5,422,887 | 6/1995 | Diepstraten et al. | 370/85.3 |
| 5,436,903 | 7/1995 | Yang et al. | 370/79 |
| 5,446,735 | 8/1995 | Tobagi et al. | 370/445 |
| 5,526,355 | 6/1996 | Yang et al. | 370/85.3 |
| 5,535,212 | 7/1996 | Koopman et al. | 370/85.6 |
| 5,625,626 | 4/1997 | Umekita | 370/448 |
| 5,673,254 | 9/1997 | Crayford | 370/231 |

FOREIGN PATENT DOCUMENTS

| | | |
|---|---|---|
| 0632621 A | 4/1995 | European Pat. Off. . |
| WO 96/10304 | 4/1996 | WIPO . |

OTHER PUBLICATIONS

AMD, AM79C970 PCnet™–PCI Single–Chip Ethernet Controller for PCI Local Bus, Jun. 1994, pp.1–868 –1–1033.

Ramakrishnan and Yang, "The Ethernet Capture Effect: Analysis and Solution", IEEE Local Computer Networks (LCN) Conference, Minneapolis, MN, Oct. 1994, pp. 228–240.

W. Hayes et al., "Solving Capture in Switched Two–Node Ethernets by Changing Only One Node", Proceedings of 20th Local Computer Networks Conference (IEEE), Minneapolis, MN, Oct. 16–19, 1995, pp. 387–395.

Comer, D.E., et al., "A Rate–Congested Avoidance and Control Scheme for Packet Switched Networks," Proceedings of the International Conference on Distributed Computin Systems, Paris, May 28–Jun. 1, 1990, Conf. 10, 28 May 1990, IEEE, pp. 390–397.

(List continued on next page.)

*Primary Examiner*—Alyssa H. Bowler
*Assistant Examiner*—Dzung C. Nguyen

[57] ABSTRACT

Delay times are modified in Ethernet network devices by adding a slot time to the minimum interpacket gap (IPG) interval between uninterrupted consecutive transmissions by a network station. If a network station transmits a data packet and has another data packet to send, modified delay time prevents the station from contending for access of the media, enabling other stations having data to transmit to attempt access on the media. If a collision occurs during the transmission of a second successive data packet, the network station uses a modified collision arbitration and automatically sets the collision delay interval to zero for the first access attempt. If another collision occurs during the access attempt, the collision interval is calculated according to the truncated binary exponential backoff algorithm.

17 Claims, 5 Drawing Sheets

OTHER PUBLICATIONS

Williamson, C.L, et al., "Loss–load Curves: Support for Rate–Based Congestion Control in High–Speed Datagram Networks," Proceedings of the Conference on Communications Architectures and Protocols (SIGCOMM), Zurich, Sep. 3–6, 1996, vol. 21, No. 4,3 Sep. 1991, Association for Computing Machinery, pp. 17–28.

Pouzin, Louis, "Methods, Tools, and Observations of Flow Control in Packet–Switched Data Networks," IEEE Trans. on Communications, vol. 29,No. 4, Apr. 1981, New York, pp. 413–426.

Gerla, M. et al., "Congestion Control in Interconnected LANS," IEEE Network, vol. 2, No. 1, 2 Jan. 1988, New York, pp. 72–76.

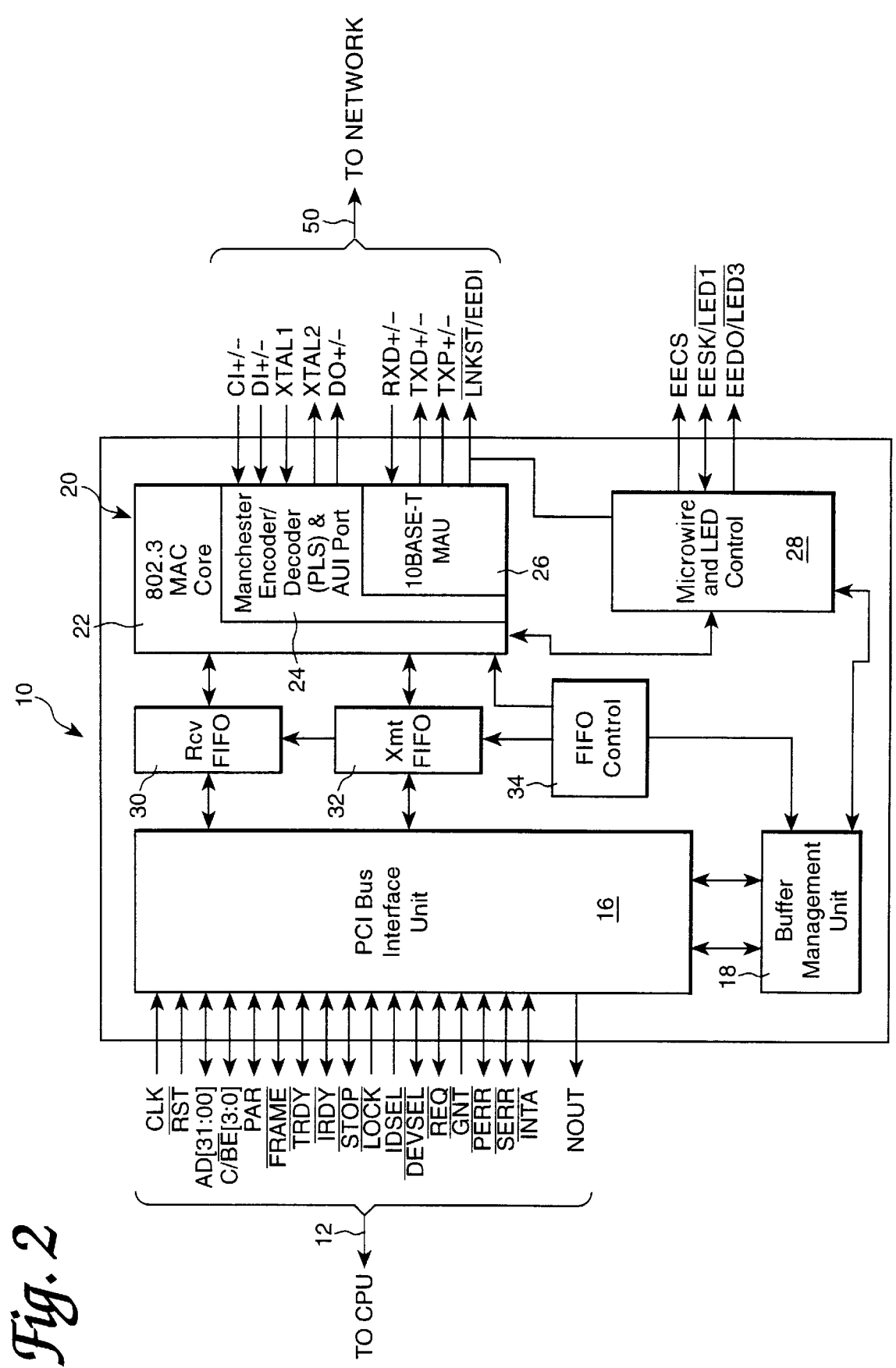

METHOD AND APPARATUS AVOIDING CAPTURE EFFECT BY ADDING A SLOT TIME TO AN INTERPACKET GAP INTERVAL IN A STATION ACCESSING AN ETHERNET NETWORK

FIELD OF THE INVENTION

The present invention relates to network interfacing and more particularly, to methods and systems efficiently accessing Ethernet media.

DESCRIPTION OF THE RELATED ART

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a media access mechanism that permits all stations to access the network channel with equality. Each station includes an Ethernet interface card that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined time after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet networks mediate collisions by using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (N) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of slot times from the range of zero to $2^N-1$. For example, if the number of attempts N=3, then the range of randomly selected slot times is (0,7); if the randomly-selected number of slot times is four, then the collision backoff interval will be equal to four slot time intervals. According to Ethernet protocol, the maximum range of randomly selected slot times is $2^{10}-1$.

The truncated binary exponential algorithm has the disadvantage that the range of randomly selected slot times (0, $2^N-1$) increases exponentially each time a specific station loses a retry attempt after collision, resulting in a higher probability that during the next collision mediation the station will randomly select a larger integer multiple of slot times and lose the next collision mediation. Thus, a new station that has data to transmit has a higher probability of winning a collision mediation than the station having a greater number of attempts. This effect is known as the capture effect, wherein a new station in the collision mediation effectively has a greater probability of capturing access to the media than the losing station until the maximum number of attempts has been reached.

One proposed solution is described in Ramakrishman et al., "The Ethernet Capture Effect: Analysis and Solution," IEEE Local Computer Networks (LCN) Conference, Minneapolis, Minn., October, 1994, pages 228–240, the disclosure of which is incorporated in its entirety by reference. The proposed solution by Ramakrishman, referred to as capture avoidance binary exponential backoff (CABEB), uses the standard binary exponential backoff with enhancements for collision resolution in a special case when a station attempts to capture the channel subsequent to an uninterrupted consecutive transmit period. The CABEB uses a modified backoff algorithm when a collision occurs on the second packet of an uninterrupted consecutive transmit.

FIGS. 1A, 1B and 1C are diagrams illustrating examples of a station transmitting consecutive packets, also referred to as "back-to-back transmit." FIG. 1A is an example of uninterrupted consecutive transmit, where station A sends a data packet (A1) 1 and then a second packet (A2) 5, with no other stations contending for the media during an idle interval 3 between transmissions of the first data packet (A1) 1 and the second data packet (A2) 5. Hence, uninterrupted consecutive transmit involves a station successfully transmitting a first data packet, an idle interval 3, and transmission by the same station of a second packet 5 (i.e., transmitting the first bit of the preamble).

FIG. 1B is an example of interrupted consecutive transmit, where station A transmits a first packet 1, and then a second packet 5 after a collision 7 on the media. In this case, station A is not involved with the collision 7.

FIG. 1C is an example of captured transmit, where the second packet 5a of an uninterrupted consecutive transmit is involved in a collision, and station A wins the collision resolution to complete the transmission of the second packet 5b.

The CABEB modifies the truncated binary exponential backoff algorithm based on the premise that there can be no more than one station in an uninterrupted consecutive transmit state at any given time on a CSMA/CD local area network. The CABEB algorithm calculates the collision backoff interval for an uninterrupted consecutive transmission as follows: if the number of collision attempts equals 1, then the collision backoff interval equals two (2) slot time intervals; if the number of collisions equals 2, then the collision backoff interval equals zero (0) slot times; and if the number of collision attempts is greater than 2, then the conventional TBEB algorithm is followed.

Although the CABEB algorithm reduces the capture effect, implementation of the CABEB algorithm in small networks, such as a 2-station or 3-station Ethernet network, substantially increases the collision rate. The CABEB algorithm also reduces the network throughput, especially for small packets.

DISCLOSURE OF THE INVENTION

There is a need for a method of accessing media of an Ethernet network that increases the throughput of the Ethernet network under heavy traffic loads.

There is also a need for mediating collisions on the media of an Ethernet network that increases the efficiency of the network under heavy loads.

There is also a need for a method of accessing media of an Ethernet network that avoids the capture effect and reduces the network collision rate for 2-station and 3-station networks.

There is also a need for a method of accessing media of an Ethernet network that avoids the capture effect while maintaining the network throughput in 2-station and 3-station Ethernet networks.

These and other needs are attained by the present invention, where a station transmitting consecutive data packets on the media waits after the transmission of the first data packet by an extended delay time including a predetermined interpacket gap interval and one slot time.

According to one aspect of the present invention, a method of accessing media of an Ethernet network includes the steps of transmitting a first data packet from a network station onto the media, detecting if the network station has a second data packet for transmission onto the media upon completion of the first packet transmission, waiting a delay time that includes a predetermined interpacket gap interval and one slot time if the detecting step detects the second data packet, and attempting access of the media by the network station in response to the delay time. The addition of a slot time to the delay time between consecutive transmissions by a network station minimizes collisions by deferring to another station having a data packet to transmit on the media. Hence, if a station has another packet to send, that station will not contend for access of the media but will defer to other stations having data to transmit on the media.

In another aspect of the present invention, a method of mediating collisions on media of an Ethernet network includes the steps of sensing a collision on the media caused in response to transmission of a current data packet by a network station, setting a collision delay interval in the network station to zero if the network station has successively transmitted a first data packet and the current data packet and if a number of access attempts for transmitting the current data packet equals one, and attempting access of the media in response to the detected collision and after the collision delay interval. The setting of the collision delay interval to zero if the network station has successively transmitted two (2) data packets ensures that the station has a greater probability of completing transmission of the second data packet, minimizing the number of subsequent access attempts. If another collision occurs during the access attempt, the collision delay interval can be calculated as an integer multiple of a predetermined slot time randomly selected from a range of intervals calculated from an exponential number of the access attempts.

Still another aspect of the present invention provides a network interface for connection with media of an Ethernet network, comprising a carrier sensor sensing deassertion of a receive carrier on the media, a delay time calculator selectively adding a slot time interval to a predetermined interpacket gap interval to obtain a delay time, the calculator adding the slot time interval to the predetermined interpacket gap interval in response to the successful transmission of a packet by the network interface, and a media access device attempting access of the media in response to the sensed deassertion of the media and the delay time.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein:

FIG. 2 is a block diagram of a network interface according to an embodiment of the present invention.

BEST MODE FOR CARRYING OUT THE INVENTION

Figure 1A:
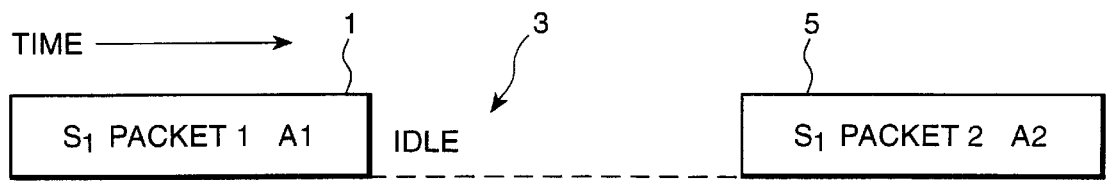
FIGS. 1A, 1B and 1C are diagrams illustrating examples of consecutive transmission of data packets by a station onto an Ethernet media.
Figure 1B:
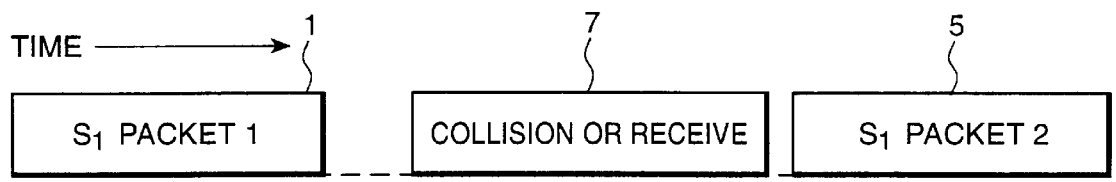
Figure 1C:
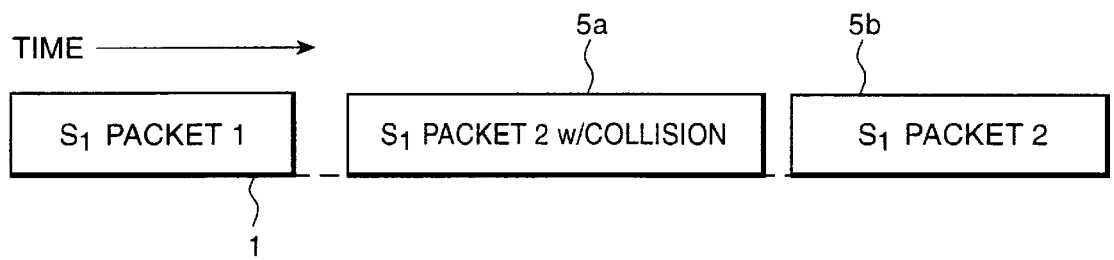

FIG. 2 is a block diagram of an exemplary network interface 10 that accesses the media of an Ethernet (ANSI/IEEE 802.3) network according to an embodiment of the present invention, resulting in avoidance of capture effect, increased throughput on the network during heavy traffic, and reduced collisions.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the commercially available Am79C970 PCnet™-PCI Single-Chip Ethernet Controller for PCI Local Bus from Advanced Micro Devices, Inc., Sunnyvale, Calif., disclosed on pages 1–868 to 1–1033 of the AMD Ethernet/IEEE 802.3 Family 1994 World Network Data Book/Handbook, the disclosure of which is incorporated in its entirety by reference.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes a microwire EEPROM interface 28, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The Manchester encoder and attachment unit interface (AUI) 24 includes a Collision In (CI+/−) differential input pair, operating at pseudo ECL levels, that signals to the network interface 10 when a collision has been detected on the network media. A collision occurs when the CI inputs are driven with a 10 MHz pattern of sufficient amplitude and pulse width that meets the ISO/IEC 8802-3 (ANSI/IEEE 802.3) standards. The Data Out (DO+/−) output pair of the AUI 24 transmits Manchester encoded data at pseudo ECL levels onto the network media 50. Similarly, the twisted pair interface 26 includes 10BASE-T port differential receivers (RXD+/−) and 10BASE-T port differential drivers (TXD+/−).

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 detects a collision by the CI inputs, and the MAU 26 detects a collision by sensing activity on both twisted pair signals RXD and TXD.

The media 50 may be either coaxial, fiber optic, or twisted pair wire, and hence may couple the interface 10 to 10BASE-T, 10BASE-2, 100BASE-TX, 100BASE-T4, or 100BASE-FX networks. The network may operate at 10 megabits per second (10 Mbit/s), 100 megabits per second (100 Mbit/s), or 1000 megabits per second (1000 Mbit/s).

Figure 3A:
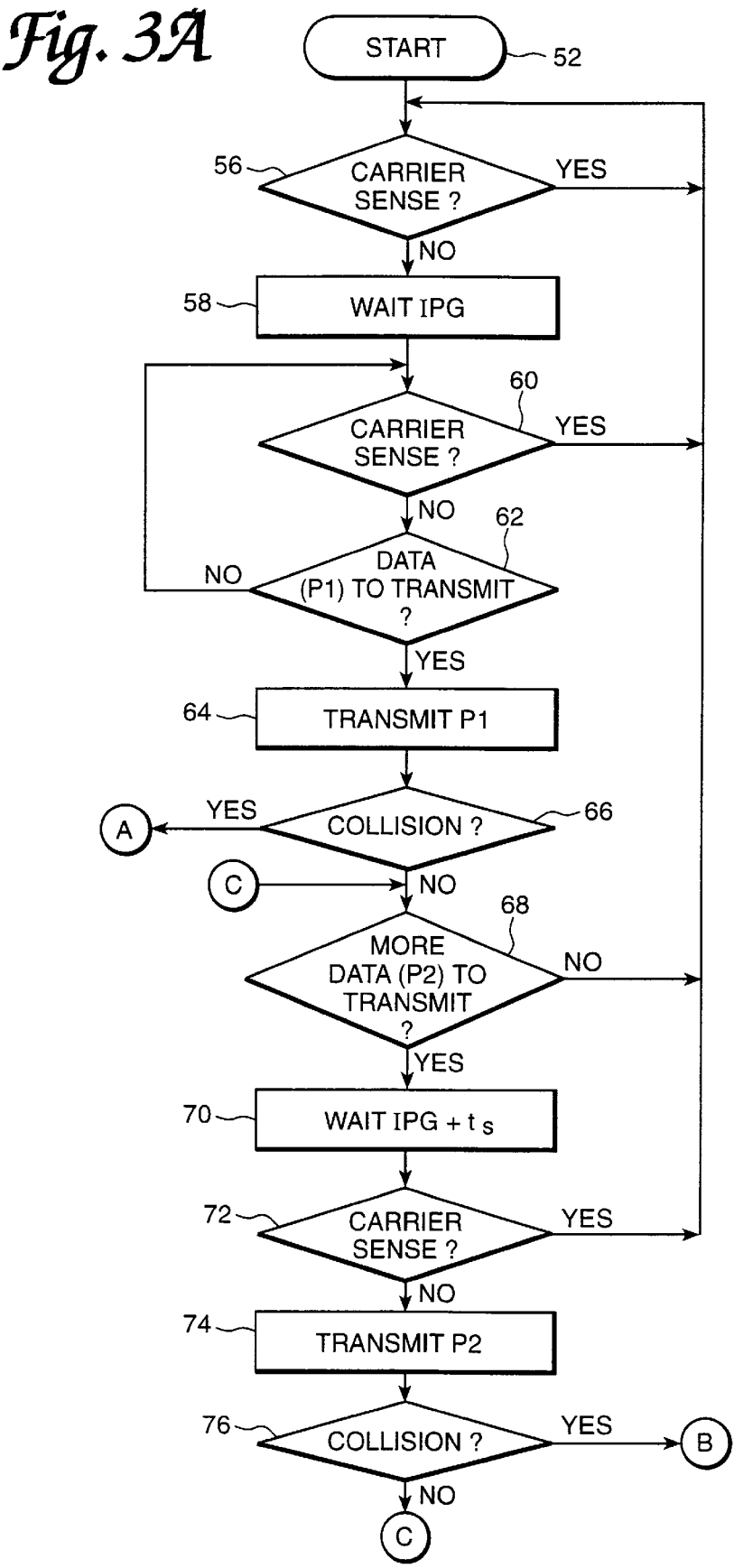
FIGS. 3A, 3B and 3C are flow diagrams of the method for accessing media of the Ethernet network according to the present invention.

FIG. 3A is a flow diagram of a method by a network station having the network interface 10 for accessing the media 50 of an Ethernet network. The method of the present invention can be implemented by embedding executable code within a memory element in the MAC 22 (e.g., register, EPROM, EEPROM, flash memory).

The media access controller (MAC) 22 in the network interface 10 starts in step 52, during which point the Ethernet media 50 is busy with transmission activity by a station. The MAC 22 then checks in step 56 if a receive carrier is sensed on the media 50 using the CSMA/CD, indicating that the network is busy. If the receive carrier is sensed, the MAC 22 waits in step 56 until deassertion of the receive carrier on the media 50 is detected. The MAC 22 starts a delay timer in step 58 in response to the sensed deassertion of the receive carrier, which causes the MAC 22 to wait the minimum IPG interval of 9.6 microseconds ($\mu$s) for a 10 Mbit/s network and 0.96 $\mu$s for a 100 Mbit/s network. A similar IPG interval can be provided for a 1000 Mbit/s network.

While waiting the minimum IPG interval, the MAC 22 checks in step 60 if the carrier is detected on the media 50. If a carrier is detected in step 60, the MAC 22 returns to the wait state in step 56, causing the delay timer to be reset. If no carrier is detected during the delay interval, the MAC 22 checks in step 62 whether the transmit FIFO 32 has a data packet (P1) to send. If the transmit FIFO 32 has data to send, the MAC 22 begins to transmit the data packet (P1) in step 64.

After transmission has begun in step 64, the MAC 22 checks in step 66 to determine whether a collision has been detected. If a collision is detected in step 66, the MAC 22 performs conventional collision mediation using the truncated binary exponential backoff (TBEB) algorithm, shown in FIG. 3B.

If no collision is detected, then transmission is completed, and the MAC 22 checks in step 68 if the transmit FIFO 32 has another data packet (P2) to send. If the MAC 22 determines that there is no additional data to be sent, the MAC 22 returns to step 56, where the MAC 22 waits the minimum IPG in step 58 upon detecting the absence of a carrier on the media 50 in step 56.

If in step 68 the MAC 22 determines that another packet (P2) is to be sent, the MAC 22 does not contend for access after the minimum IPG interval. Rather, the MAC 22 waits after the transmission of the data packet (P1) in step 70 by a delay time equal to the IPG interval plus one slot time ($t_s$). A slot time ($t_s$) has a duration equal to 512 bit times for 10 and 100 Mbit/s networks. Hence, a slot time will have a duration of 51.2 microseconds in a 10 megabit per second network and 5.12 microseconds in a 100 megabit per second network. The slot time ($t_s$) for a 1000 Mbit/s network is selected in accordance with the network topology and propagation delay, and preferably has a duration equal to 4096 bit times.

While waiting the delay interval including the IPG interval and the one slot time ($t_s$) in step 70, the MAC 22 checks in step 72 whether the carrier is detected on the media 50. If the carrier is detected during the delay interval, the MAC 22 returns to the wait state in step 56 to reset the delay timer. If no carrier is detected, the MAC 22 begins transmission of the second data packet (P2) in step 74.

Thus, the MAC 22 provides a collision avoidance mechanism particularly effective in small Ethernet networks such as 2-station or 3-station networks, where a station having successfully transmitted a single packet defers contending for access of the media by waiting an additional slot time before contending for access. Hence, another station on the network has an opportunity to transmit, for example, an acknowledgement data packet in response to the original data packet (P1) sent by the first station. As shown below, the collision avoidance method shown in FIG. 3A substantially reduces the network collision rate in 2-station and 3-station Ethernet networks.

After transmission has begun in step 74, the MAC 22 checks in step 76 to determine whether a collision has been detected. If no collision is detected, then transmission is completed, and the MAC 22 returns to step 68 to check if the transmit FIFO 32 has another packet (P3) to send. If the MAC 22 detects a collision in step 76, then the MAC 22 performs a modified collision mediation, shown in FIG. 3C.

According to the present invention, if a collision occurs during uninterrupted consecutive transmit by the MAC 22, the MAC 22 selects zero slot times for the first collision and immediately tries retransmission. Specifically, if the MAC 22 is able to transmit consecutive data packets P1 and P2 and collision occurs during transmission of the second data packet P2 in step 74, the MAC 22 sets the collision delay interval in the network station to zero (0) if the number of access attempts (i.e., the number of collisions) equals 1. Hence, the modified collision mediation of the present invention gives priority to the station having deferred once to another station (e.g., by waiting an additional slot time before transmission of another packet). In addition, the modified collision mediation of the present invention provides a greater probability that a station having deferred once will complete transmission of the data to be sent by temporarily capturing access to the media. If another collision occurs, the MAC 22 follows the conventional TBEB algorithm.

Figure 3B:
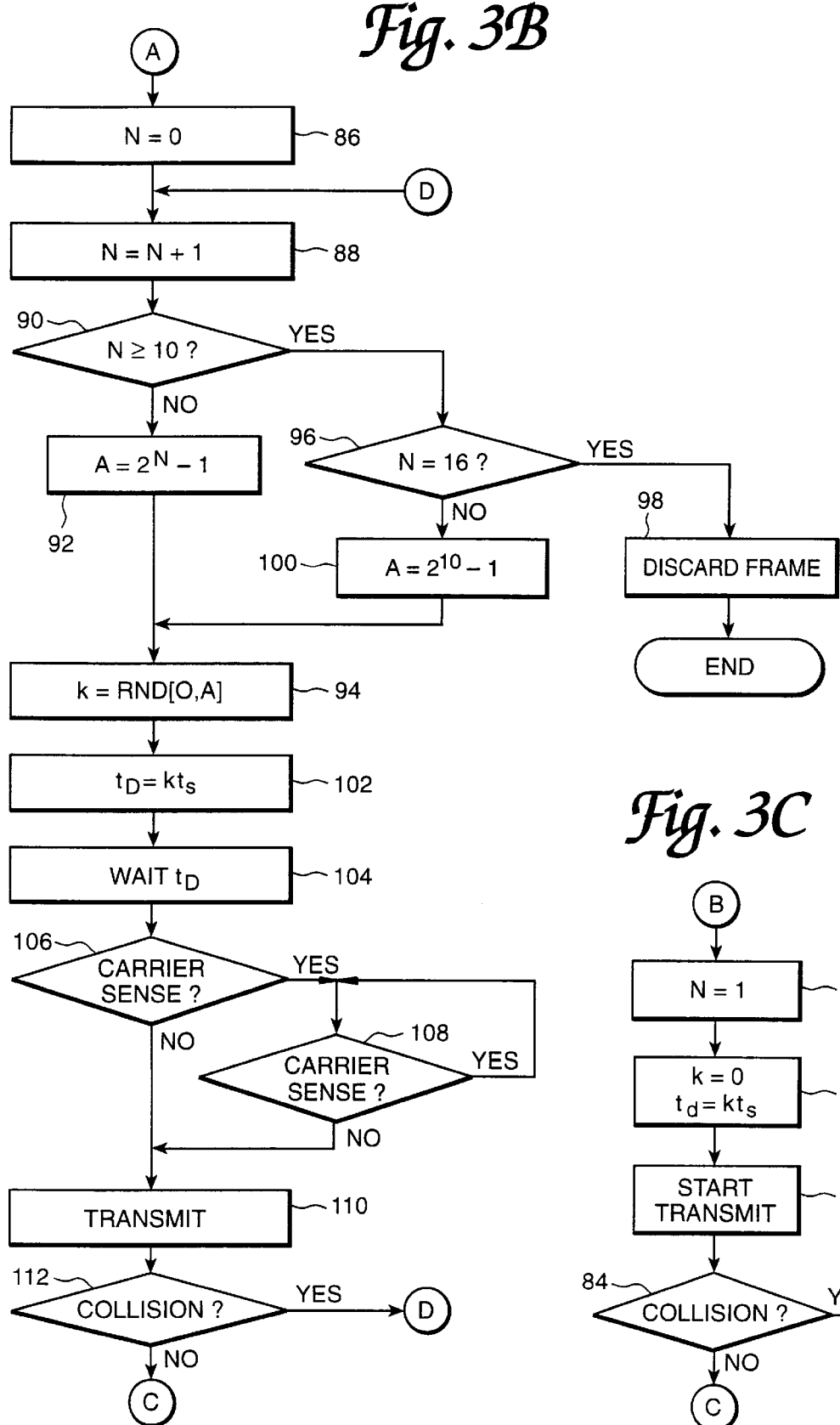
Figure 3C:
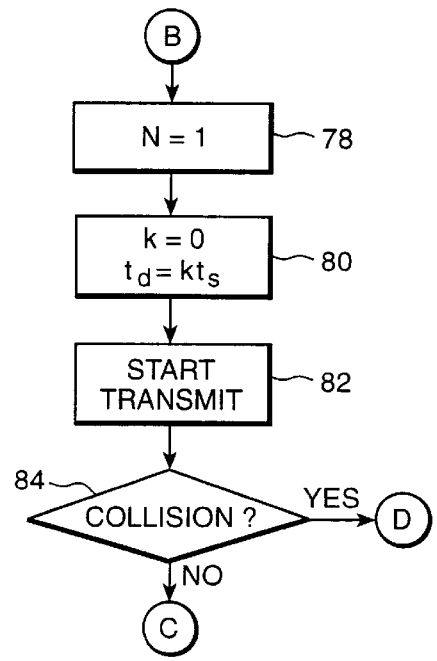

As shown in FIG. 3C, the modified collision mediation during transmission of the second data packet (P2) in step 74 begins by setting an internal collision counter in step 78 to one (N=1), identifying the first collision/transmission attempt. The MAC 22 then sets the collision delay interval ($t_d$) to zero (0) in step 80, for example by setting a coefficient (k) representing an integer coefficient of the slot time to zero (k=0), where a collision delay interval is calculated according to the equation $t_d = k t_s$, where $t_s$ is the slot time interval having a duration of 512 bit times.

After setting the collision delay interval to zero, the MAC 22 sets an internal collision delay counter to the zero value of the collision delay interval, causing immediate retransmission of the packet P2 in step 82.

The MAC 22 then checks in step 84 whether a collision is sensed on the media. If a collision is detected in step 84, the MAC 22 performs collision mediation according to the TBEB algorithm, shown in FIG. 3B.

Collision mediation according to the TBEB algorithm begins generally in FIG. 3B by initializing an internal collision counter in step 86 (N=0) and incrementing the collision counter in step 88. Thus, if a collision is detected in step 66 at FIG. 3A, the collision counter (N) is initially set to 1 (N=1) in step 88; if a collision is detected in step 84 of FIG. 3C, the collision counter (N) is incremented to 2 (N=2) in step 88. The MAC 22 then checks in step 90 if the number of collisions (N) is greater than or equal to ten.

If the number of access attempts (N) is less than ten in step 90, then an exponential number of access attempts (A) is determined in step 92 according to the equation $A=2^N-1$. If in step 90 the number of collisions N is greater than or equal to ten, the MAC 22 then checks in step 96 if the number of collisions is equal to sixteen. If the number of collisions is equal to sixteen, then the frame or data packet to be transmitted is discarded in step 98 in accordance with Ethernet ((ANSI/IEEE 802.3) protocol. If N is less than 16, then the exponential number of access attempts is set in step 100 to $A=2^{10}-1$, or 1,023.

After calculating the exponential number of access attempts A, the MAC 22 randomly selects an integer value k in step 94 from the range between 0 and the exponential number of access attempts A having a maximum value of 1,023. The randomly-selected number k is then applied in step 102 to generate the delay time equal to a randomized integer multiple (k) of slot times ($t_s$).

After the delay time is calculated in step 102, the MAC 22 uses the internal collision delay counter to wait in step 104 for the calculated delay time $t_d$. During the delay time $t_d$, the MAC 22 checks in step 106 whether a carrier is sensed on the media. If a receive carrier is asserted on the media, the MAC 22 resets the delay timer in step 108 and waits until deassertion of the receive carrier is sensed. Although not shown, waiting in step 108 includes waiting for at least the IPG interval after sensing deassertion of the receive carrier (see steps 56 and 58). If the carrier is not sensed in step 106, then the MAC 22 in step 110 attempts access of the media in response to the detected collision and after the collision delay interval $t_d$ in step 104. If a collision occurs in step 112, the process returns to step 88. If no collision is detected, then the process returns to step 68 to complete transmission.

Figure 4:
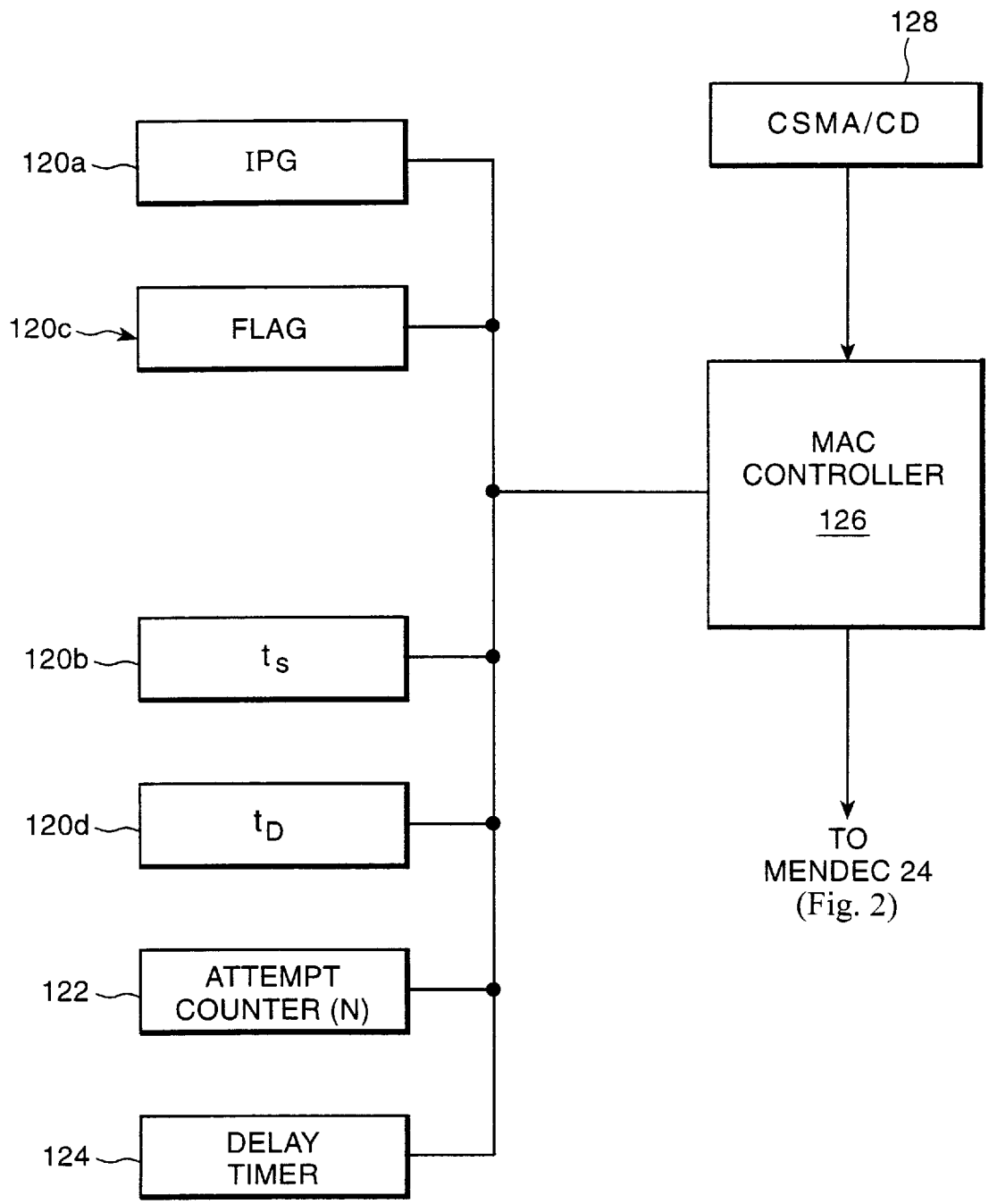
FIG. 4 is a block diagram of the media access control (MAC) of FIG. 1.

FIG. 4 is a block diagram illustrating the functional components of the MAC 22. The media access control 22 includes a plurality of registers 120, a collision counter 122 that counts the delay, a controller 126 and a carrier sense multiple access/collision detection (CSMA/CD) portion 128. The values of IPG and $t_s$ stored in registers 120a and 120b respectively are pre-loaded in a nonvolatile memor-storing the number of access attempts (N), a delay timer 124 y element. The register 120c stores a flag (FLAG) indicating using the delay interval of step 70. The MAC controller 126, also referred to as a delay time calculator, calculates the delay time $t_d$, described above, and stores the resulting delay time in register 120d.

The MAC controller 126 starts the delay timer 124 in response to a signal from the CSMA/CD 128 indicating that deassertion of the receive carrier on the media has been sensed. The MAC controller 126 sends an instruction to the Manchester encoder/decoder 24 (MENDEC) to attempt access to the media after the delay timer has reached the determined delay time $t_d$ stored in register 120d.

According to the present invention, the addition of a slot time to the minimum IPG is consistent with Ethernet protocol because the protocol specifies only minimum delay times. Hence, the present invention minimizes the capture effect while improving the throughput of the network during heavy traffic conditions.

Tables 1, 2 and 3 illustrate the improvement in performance of the disclosed embodiment (EMB) compared to the truncated binary exponential backoff (TBEB) algorithm and the capture avoidance binary exponential backoff (CABEB) algorithm proposed by Ramakrishman et al. The network traffic simulated is an UDP type traffic in which a station transmits packets to other stations. No acknowledgements are generated and packets that are discarded are not retransmitted.

Tables 1 and 2 show the throughput and collision likelihood for a 2-station, 100 megabit/second network for fifteen hundred (1500) byte packets. The throughput of the disclosed embodiment (EMB) is better than the CABEB algorithm, and the collision likelihood for the disclosed embodiment is lower than the TBEB and CABEB algorithms.

TABLE 1

Two-Station Ethernet Network Performance for UDP type traffic (1500 bytes)

| Performance Metrics | TBEB | CABEB | EMB |
| --- | --- | --- | --- |
| Network Throughput | 96.3 Mbps | 93.9 Mbps | 96.7 Mbps |
| Ntwk. Idle Time % | 1.7% | 1.67% | 1.5% |
| Percentage of packets > attemptLimit | 0.63% | 0 | 0 |
| Collision Rate | 9.5% | 99.9% | 0% |

TABLE 2

Access Latency for 2-station network (1500 bytes)

| | TBEB | | | CABEB | | | EMB | | |
| --- | --- | --- | --- | --- | --- | --- | --- | --- | --- |
| | Mean ($\mu s$) | $\sigma^1(\mu s)$ | 95th percentile | Mean ($\mu s$) | $\sigma^1(\mu s)$ | 95th percentile | Mean ($\mu s$) | $\sigma^1(\mu s)$ | 95th percentile |
| Station 1 | 124.8 | 0.057 | 127.7 | 255.5 | 8.54E-7 | 255.5 | 242.9 | 9.8E-7 | 242.9 |
| Station 2 | 125.5 | 0.550 | 127.7 | 255.5 | 8.54E-7 | 255.5 | 252.8 | 9.8E-7 | 242.9 |

As shown in Table 2, the mean access latency for the disclosed embodiment (EMB) is less than the CABEB algorithm, and the standard error is negligible in comparison with the TBEB algorithm. Access latency is defined as the time interval when the frame is at the head of the MAC queue until successful transmission, including the transmit time on the wire. Standard error is defined as the standard deviation of the mean. Tables 3 and 4 show similar results for a 3-station network, having user data protocol (UDP) type of traffic.

TABLE 3

Three-Station Ethernet Network Performance for UDP type traffic (1500 bytes)

| Performance Metrics | TBEB | CABEB | EMB |
|---|---|---|---|
| Network Throughput | 95.9 Mbps | 94.0 Mbps | 96.1 Mbps |
| Ntwk. Idle Time % | 1.86% | 2.12% | 1.82% |
| Percentage of packets > attemptLimit | 1.27% | 0.8% | 0.64% |
| Collision Rate | 18.3% | 75.6% | 10.5% |

TABLE 4

Access Latency for E-station network (1500 bytes)

| | TBEB | | | CABEB | | | EMB | | |
|---|---|---|---|---|---|---|---|---|---|
| | Mean ($\mu$s) | $\sigma^1(\mu m)$ | 95th percentile | Mean ($\mu$s) | $\sigma^1(\mu m)$ | 95th percentile | Mean ($\mu$s) | $\sigma^1(\mu m)$ | 95th percentile |
| Station 1 | 126.1 | 0.23 | 130.9 | 224.1 | 0.59 | 255.5 | 244.6 | 0.82 | 263.8 |
| Station 2 | 127.9 | 1.02 | 130.9 | 220.6 | 2.0 | 255.5 | 245.7 | 0.56 | 263.8 |
| Station 3 | 128.5 | 1.28 | 130.9 | 216.3 | 1.21 | 255.5 | 243.9 | 0.74 | 313.4 |

As shown above, the disclosed embodiment provides substantial improvement in avoiding the capture effect while improving the performance metrics of the network. Although the improvements will vary depending on the configuration of the network, similar results will be achieved for TCP/IP and IPX type of traffic since the collision rate is very small.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A method of accessing media of an Ethernet network, comprising:
   transmitting a first data packet from a network station onto the media;
   detecting if the network station has a second data packet for transmission onto the media upon successful completion of the first packet transmission;
   waiting after the transmitting step a delay time, including a predetermined interpacket gap interval and one slot time, if the detecting step detects said second data packet; and
   attempting access of the media by the network station in response to the delay time.

2. The method of claim 1, wherein the attempting access step comprises:
   sensing whether a receive carrier is asserted on the media; and
   transmitting the second data packet if the receive carrier is not asserted on the media.

3. The method of claim 1, wherein the attempting access includes transmitting the second data packet on the media, the method further comprising:
   sensing a first collision on the media during the transmission of the second data packet;
   setting a collision delay to zero; and
   attempting a next access of the media after the sensed first collision and in response to the set collision delay.

4. The method of claim 3, wherein the attempting next access step includes retransmitting the second data packet, the method further comprising:
   sensing a second collision on the media during the retransmission of the second data packet;
   calculating a second collision delay by multiplying the slot time by an integer randomly selected from a range of integers calculated from an exponential number of access attempts; and
   attempting a third access of the media in response to the sensed second collision and the second collision delay.

5. The method of claim 1, wherein the attempting access step comprises sensing assertion of a receive carrier on the media, the method further comprising:
   sensing deassertion of the receive carrier in response to the sensed assertion;
   waiting the predetermined interpacket gap interval after the sensed deassertion; and
   transmitting the second data packet after waiting the predetermined interpacket gap interval.

6. The method of claim 1, wherein the slot time has a duration equal to five hundred twelve (512) bit times.

7. The method of claim 6, wherein the network has a data rate of 100 megabits per second and the slot time equals 5.12 microseconds.

8. The method of claim 6, wherein the network has a data rate of 10 megabits per second and the slot time equals 51.2 microseconds.

9. The method of claim 1, wherein the network has a data rate of 1000 megabits per second and the slot time has a duration equal to four thousand ninety six (4096) bit times.

10. The method of claim 1, wherein the network has a data rate of one of 10 megabits per second and 100 megabits per second and said predetermined interpacket gap interval is one of 9.6 microseconds and 0.96 microseconds, respectively.

11. A method of mediating collisions on media of an Ethernet network, comprising:
    transmitting a first data packet from a network station onto the media;

transmitting a second data packet by the network station after the first data packet, comprising the steps of:
(1) setting a delay interval to include a predetermined interpacket gap interval and one slot time interval,
(2) determining whether a receive carrier is asserted on the media, and
(3) transmitting the second data packet after the transmission successful of the first data packet and in response to said delay interval if the receive carrier is not asserted on the media;

sensing a collision on the media;

setting a collision delay interval to zero if a number of collisions encountered by the network station equals one; and attempting access of the media in response to the detected collision and in response to the set collision delay interval.

12. The method of claim 11, further comprising:

calculating the collision delay interval in response to said number of collisions being greater than one, comprising the steps of:

randomly selecting an integer from a range of integers calculated from an exponential number of said number of collisions; and multiplying the slot time by the randomly selected integer to obtain the collision delay interval.

13. A method of mediating collisions on media of an Ethernet network, comprising:

sensing a collision on the media caused in response to transmission of a current data packet by a network station;

setting a collision delay interval in the network station to zero if the network station has successively transmitted a first data packet and said current data packet, and if a number of access attempts for transmitting said current data packet equals one; and attempting access of the media in response to the detected collision and after the collision delay interval.

14. The method of claim 13, wherein the range of integers has a maximum value of $2^{10}-1$.

15. The method of claim 13, further comprising calculating said collision delay interval if said setting step is not performed, comprising the steps of:

(1) randomly selecting an integer from a range of integers calculated from an exponential number of said access attempts, and (2) multiplying the integer with a predetermined slot time to obtain said collision delay interval.

16. A network interface for connection with media of an Ethernet network, comprising:

a carrier sensor sensing deassertion of a receive carrier on the media;

a delay time calculator selectively adding a slot time interval to a predetermined interpacket gap interval to obtain a delay time, the calculator adding the slot time interval to the predetermined interpacket gap interval in response to successful transmission of a packet by the network interface; and a media access device attempting access of the media in response to the sensed deassertion of the media and said delay time.

17. The network interface of claim 16, further comprising a collision sensor sensing a collision on the media, the delay time calculator selectively setting a retry delay time to zero in response to a first collision during transmission of a data packet in response to the delay time having the slot time, the media access device reattempting access of the media in response to the sensed collision and after said retry delay time.

* * * * *

UNITED STATES PATENT AND TRADEMARK OFFICE
CERTIFICATE OF CORRECTION

PATENT NO. : 5,854,900
DATED : December 29, 1998
INVENTOR(S) : Mohan KALKUNTE et al It is certified that error appears in the above-indentified patent and that said Letters Patent is hereby corrected as shown below:

In the claims,
Claim 11, Line 7, replace "transmission successful" with --successful transmission--

Signed and Sealed this

Eleventh Day of May, 1999

Attest:

Q. TODD DICKINSON

*Attesting Officer*  *Acting Commissioner of Patents and Trademarks*